United States Patent
Kovach et al.

(10) Patent No.: US 9,516,801 B2
(45) Date of Patent: Dec. 13, 2016

(54) TILLAGE IMPLEMENT WITH STOP FOR RESILIENT MOUNTING

(71) Applicant: CNH Industrial America LLC, New Holland, PA (US)

(72) Inventors: Michael G. Kovach, Morton, IL (US); Eric J. Anderson, Metamora, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/465,243

(22) Filed: Aug. 21, 2014

(65) Prior Publication Data
US 2015/0053438 A1    Feb. 26, 2015

Related U.S. Application Data

(60) Provisional application No. 61/868,401, filed on Aug. 21, 2013.

(51) Int. Cl.
*A01B 61/04* (2006.01)
*A01B 21/08* (2006.01)

(52) U.S. Cl.
CPC .......... *A01B 61/046* (2013.01); *A01B 21/083* (2013.01)

(58) Field of Classification Search
CPC ..... A01B 35/28; A01B 21/086; A01B 21/063; A01B 21/08; A01B 61/04; A01B 61/044–61/048; A01B 5/04; A01B 5/06
See application file for complete search history.

(56) References Cited

U.S. PATENT DOCUMENTS

| 3,442,336 A | * | 5/1969 | Morkoski | A01B 21/08 172/572 |
|---|---|---|---|---|
| 3,640,348 A | | 2/1972 | Womble | |
| 4,008,770 A | | 2/1977 | Boone et al. | |
| 4,206,817 A | | 6/1980 | Bowerman | |
| 4,250,970 A | * | 2/1981 | Pfenninger | A01B 63/32 172/142 |
| 4,333,535 A | | 6/1982 | Hentrich, Sr. | |
| 4,396,070 A | * | 8/1983 | Brandner | A01B 61/046 172/572 |
| 4,407,372 A | | 10/1983 | Rozeboom | |
| 4,724,910 A | * | 2/1988 | Wheeler | A01B 61/046 172/178 |
| 5,042,590 A | | 8/1991 | Bierl et al. | |
| 5,267,619 A | | 12/1993 | Eversole | |
| 6,024,179 A | | 2/2000 | Bourgault | |

(Continued)

OTHER PUBLICATIONS

Sunflower brochure, "Tillage & Seeding Product Family", AGCO, Dec. 31, 2011 (15 pages).

(Continued)

*Primary Examiner* — Matthew D Troutman
(74) *Attorney, Agent, or Firm* — Rebecca L. Henkel

(57) ABSTRACT

An agricultural tillage implement including a carriage frame assembly and pull hitch towed by a tractor and secondary frames supported by the carriage frame assembly. The secondary frames support gangs of disk blades for tilling the soil in a travel direction. Bearing hanger assemblies support the gangs of disk blades below the secondary frames through a C shaped resilient element. Stop elements are mounted on the bearing hanger assemblies and to a cross bar to limit deflection of the C shaped elements by abutting some of the secondary frames.

4 Claims, 5 Drawing Sheets

(56) References Cited

U.S. PATENT DOCUMENTS

| | | |
|---|---|---|
| 6,223,832 B1 | 5/2001 | Hook et al. |
| 6,237,696 B1 | 5/2001 | Mayerle |
| 6,695,069 B2 | 2/2004 | Rozendaal |
| 7,290,620 B2 | 11/2007 | Cooper et al. |
| 7,481,279 B2 * | 1/2009 | Blunier .................. A01B 23/06 172/509 |
| 7,631,701 B2 | 12/2009 | Kromminga et al. |
| 7,721,815 B2 | 5/2010 | Hoffman et al. |
| 8,020,629 B1 * | 9/2011 | McFarlane ............. A01B 21/08 172/145 |
| 2006/0225901 A1 * | 10/2006 | Blunier .................. A01B 23/06 172/558 |
| 2009/0000796 A1 | 1/2009 | Cooper et al. |
| 2011/0220375 A1 | 9/2011 | Connell, Jr. et al. |

OTHER PUBLICATIONS

Russian Office Action and the translation thereof dated Jul. 1, 2015 for Russian Application No. 2014125810/13 (041985) (8 pages).

\* cited by examiner

TILLAGE IMPLEMENT WITH STOP FOR RESILIENT MOUNTING

CROSS REFERENCE TO RELATED APPLICATIONS

This is a non-provisional application based upon U.S. provisional patent application Ser. No. 61/868,401, entitled "TILLAGE IMPLEMENT WITH STOP FOR RESILIENT MOUNTING", filed Aug. 21, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through the fields by a tractor, for example, a cultivator/harrow which is capable of simultaneously tilling and leveling the soil in preparation for planting. This implement includes a cultivator that is towed by a tractor in a harrow that is towed by the cultivator.

In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement.

As tillage operations have been developed to be more efficient, the implements are being called upon to operate in evermore increasing extremes of conditions. At the same time, the tillage implements are being expanded in size to provide greater efficiency in processing the soil. Tillage implements are expected to operate in more adverse conditions such as rocky soil.

With conditions such as described above, the resilient mounting of the gangs of disk blades, for example by C-shaped resilient elements, may be stressed beyond their elastic limit. This can cause deformation and with time cause premature inoperativeness of the support.

What is needed in the art therefore is a way to reliably limit the deflection of resilient supports for disk blades in implements of the above type.

SUMMARY OF THE INVENTION

The present invention provides a tillage implement with a resilient mounting for disk blades that limits deflection to maintain a reliable implement.

In one form, the invention is an agricultural tillage implement including a carriage frame assembly with a pull hitch extending in a travel direction. Secondary frames extend generally laterally with respect to the travel direction. Gangs of disk blades are journaled by and supported by bearing hangers resiliently mounted to the secondary frames to till soil over which the tillage implement traverses. A stop and mount for the bearing hanger limits deflection of the resilient bearing hanger relative to the secondary frames.

An advantage of the present invention is that the resilient support for the bearing hangers is made more reliable.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
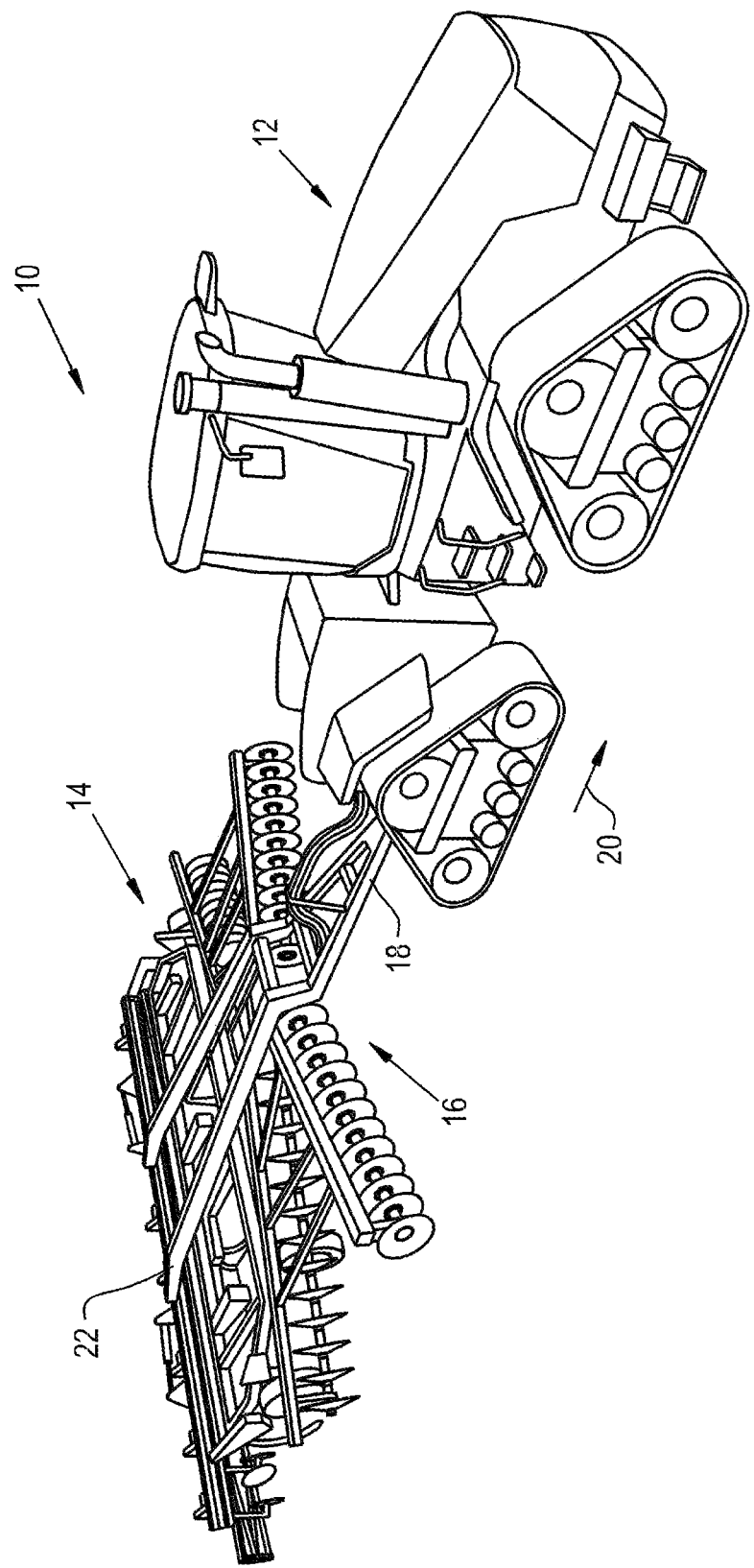
FIG. 1 illustrates a tillage implement including a support of disk blades embodying the present invention, being pulled by a tractor.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
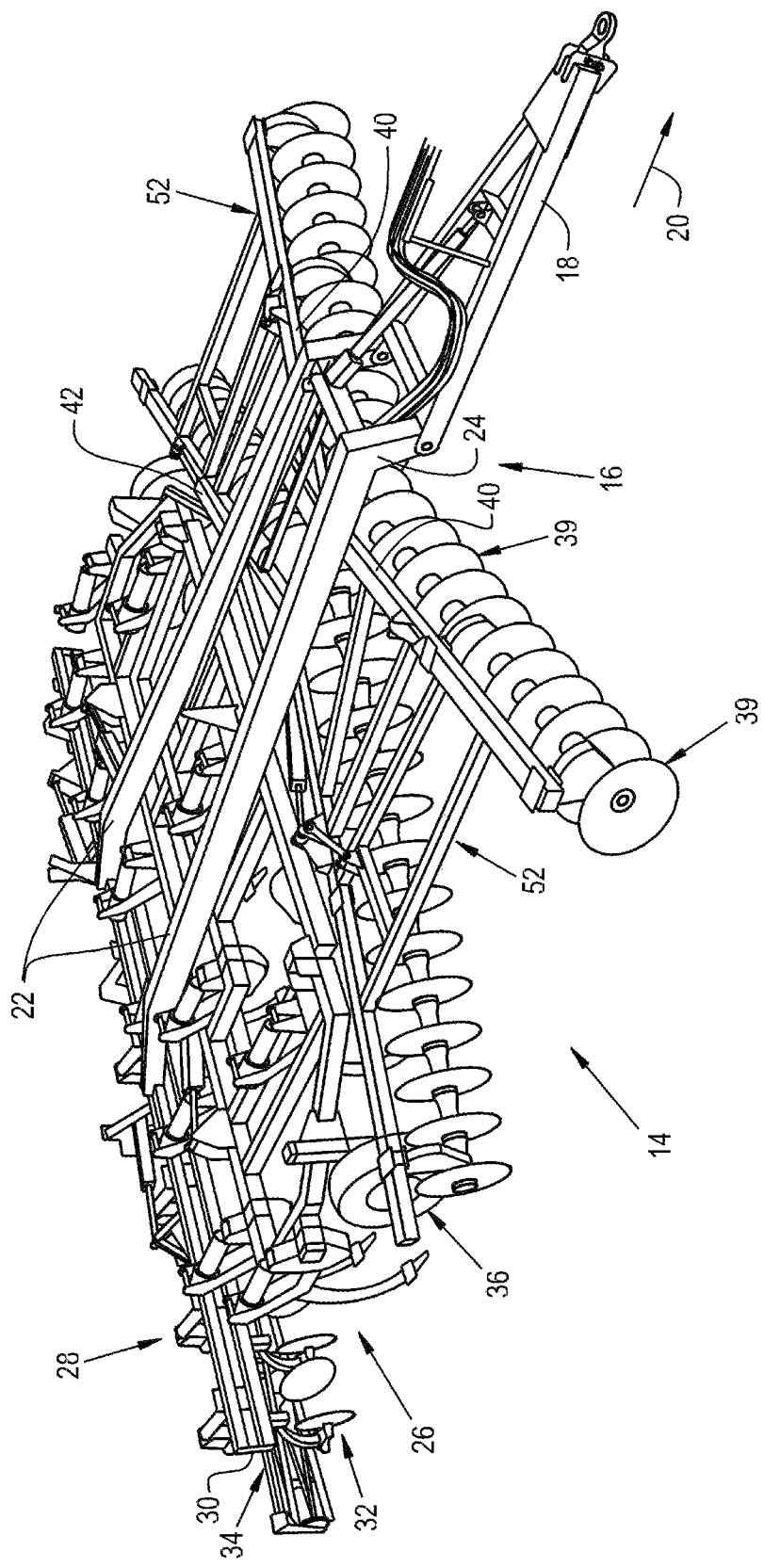
FIG. 2 is a perspective view of the tillage implement of FIG. 1.

Now, additionally referring to FIG. 2, agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft directed carrier frame members 22 which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which co-act with each other to finish the soil in preparation for planting. Leveling blades 32 and rolling basket assemblies are both attached to secondary frame 30.

Wheels 36, only one of which is shown, are actuated from tractor 12 to raise or lower the carrier frame members 22 and 23 to place the tillage apparatus in a transport position with the wheel assemblies 36 supporting the implement above the ground and an operating position in which the tillage equipment is used to till the soil.

Figure 3:
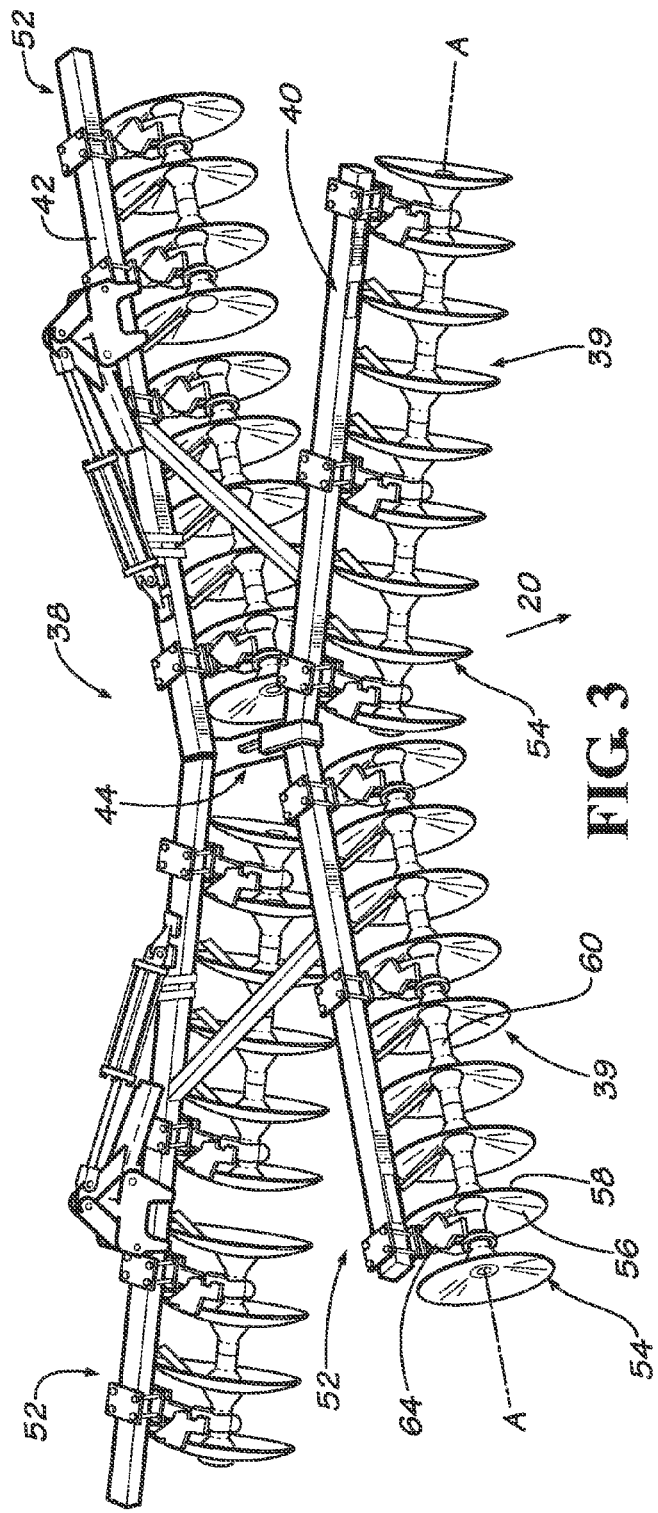
FIG. 3 is a partial perspective view of the tillage implement of FIGS. 1 and 2.

Referring now to FIG. 3, there is shown a portion of a disk frame assembly 38 which provides support for gangs of disk blades 39 shown particularly in FIG. 2. The disk frame assembly 38 includes forward and aft frame members 40 and 42, respectively. Frame members 40 and 42 are structurally interconnected by a central frame element 44 and outboard forward and aft frame members (not shown) to reinforce the frame members 40 and 42 to establish the disk frame assembly 38 in substantially a single plane when not in operation. A plurality of pivot joints 50 are positioned along outboard frame members 46 and provide pivoting support for wing sections 52, shown in particularly in FIG. 3. Wing sections 52 are pivoted between a field operating position in which they are generally horizontal with respect to the disk frame 38 and a transport position in which they are pivoted out of the plane for appropriate road clearance during the transport mode.

As shown particularly in FIG. 3, the gangs of disk blades 39 each have individual disk blades 54 having a concave side 56 and convex side 58. The individual disks 54 are each sandwiched between central shaft assemblies 60 to interconnect the disk blades and cause them to rotate about a common axis A. As noted particularly in FIG. 3, the gangs of disk blades 39 are at an angle with respect to the travel direction 20. This promotes a more effective tilling of the soil.

Figure 4:
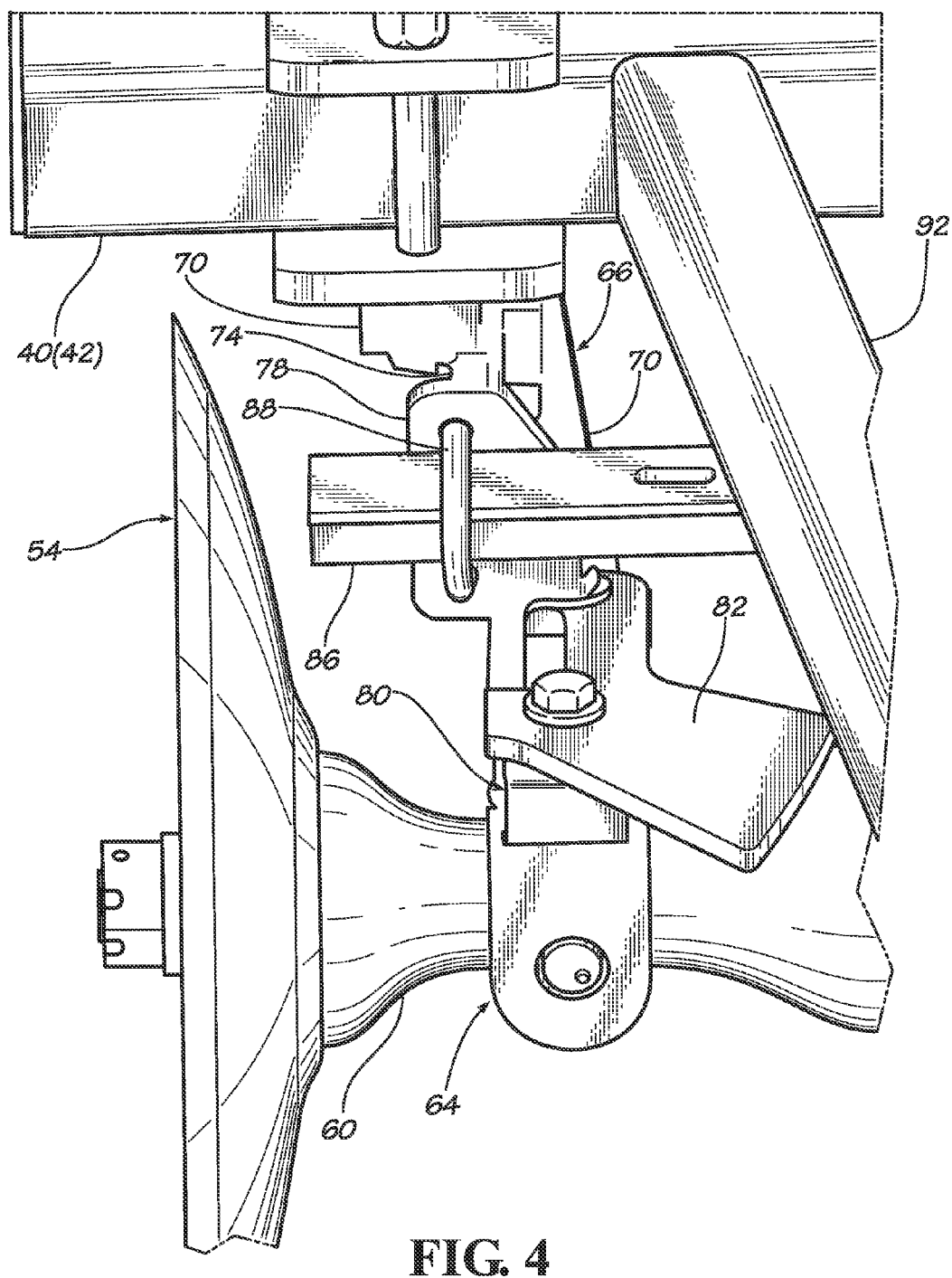
FIG. 4 is an expanded perspective view of a stop incorporated in the tillage implement of FIGS. 1 and 2.
Figure 5:
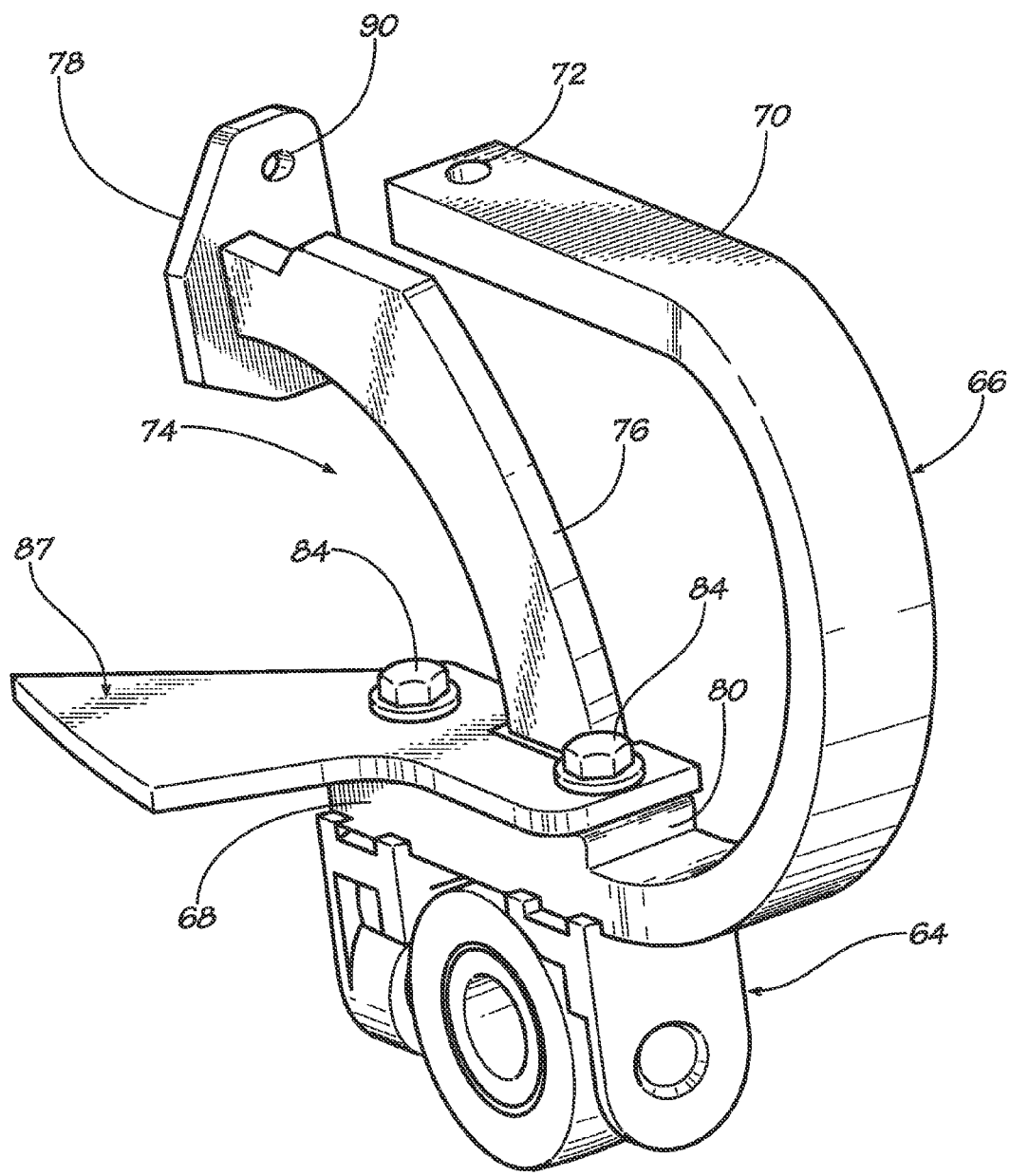
FIG. 5 is an expanded perspective view of the stop incorporated in the tillage implement of FIGS. 1-5.

Now additionally, referring to FIGS. 4 and 5, at periodic intervals along the gangs of disk blades 39, there are positioned bearing hanger assemblies 64 mounted to and supported from the secondary frames 40 and 42 by C-shaped structures 66, particularly shown in FIG. 5. As shown in FIG. 5, each bearing hanger assembly 64 is mounted to a lower section 68 of C-shaped support element 66 and an integral top section 70 is fastened to the appropriate frame element 40 and 42 through a hole 72. The C-shaped elements 66 provide a degree of flexibility resiliency for the gangs of disk blades 39 to improve tillage operations.

Figure 3A:
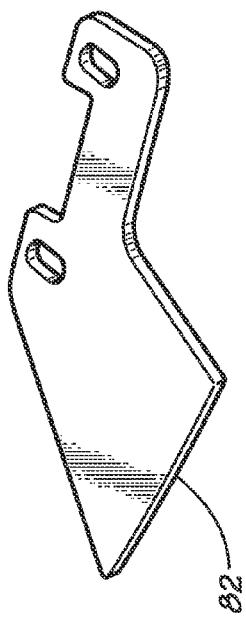
FIG. 3A is a perspective view of a scraper incorporated in the tillage implement of FIGS. 1 and 2.

In accordance with the present invention, a stop 74, shown in FIGS. 4 and 5, is mounted adjacent bearing hanger assembly 64. Stop 74 includes a curved structural element 76 having a vertically oriented mounting plate 78 at one end and a substantially horizontal mounting plate 80 abutting the top face of the bearing hanger assembly 64. The bottom plate 80 also provides mounting for a scraper deflector element 82 described in Applicant's co-pending U.S. patent application Ser. No. 14/463,761 filed Aug. 20, 2014, entitled "TILLAGE IMPLEMENT WITH SCRAPER/DEFLECTOR", and shown in FIG. 3A. The bottom plate 80 provides an angle for proper positioning of the scraper/deflector 82. Fasteners such as screws 84 mount the scraper deflector 82, lower element 80 and lower section of section 68 of C-shaped element 66 to bearing hanger assembly 64.

As shown particularly in FIG. 4, the upper plate 78 is connected to a crossbar 86 by a generally U-shaped connector 88 extending through a hole 90 in upper plate 78 and being held in place with appropriate removable fasteners. The bar 86 extends generally transverse to the direction of travel 20 and generally parallel to frame elements 40 or 42. The stop 74 is positioned so that limits deflection of the C-shaped element by the bar 86 abutting an appropriate for and aft frame member 92 shown in FIG. 4.

Thus the stop element 74 provides an effective way of limiting the deflection of the C-shaped members in a coordinated fashion so that the forces are distributed. The stop element 74 also provides a proper mounting for the scraper deflector 82 so that it is positioned in generally a horizontal plane for more effective operation. All of these benefits are achieved without the necessity for additional complicated structural interconnections.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a carriage frame assembly including a pull hitch extending in a travel direction;
   secondary frames extending generally laterally with respect to the travel direction and frame members connected to said secondary frames and extending in a fore and aft direction relative to the travel direction;
   gangs of disks blades connected to and supported by said secondary frames to till soil over which the tillage implement traverses;
   bearing hangers supported from the secondary frames for rotation about an axis generally lateral to the travel direction;
   a resilient structural element connecting the secondary frames to the bearing hangers; and
   a plurality of stops each supported by and mounted to at least one of said bearing hangers and being positioned to limit the deflection of the resilient element by abutting at least one of the secondary frames through a frame member; and said stop having a structural element having a generally horizontal plate supporting said bearing hanger assembly, a curved central plate element positioned in a plane parallel to the travel direction and a vertically oriented plate;
   a generally transversely extending bar interconnecting said stop elements at the vertically oriented plane so that the deflection of the resilient support is limited by abutment between said transversely extending bar and said frame members extending in a fore and aft direction; and
   U-shaped fasteners embracing said transverse bar and being removably connected to said vertically oriented plate.

2. The agricultural tillage implement of claim 1, wherein the resilient structural element is a C-shaped element connected at one end to said secondary frames and at the other end to said bearing hangers.

3. The agricultural implement of claim 1, further comprising a scraper/deflector removably fastened to said lower horizontal plate of said stop assembly.

4. The agricultural implement of claim 3, wherein the lower horizontal plate of said stop assembly is sandwiched between said scraper/deflector and said bearing hanger.

* * * * *